April 27, 1926.  
J. ING  
TRACTOR CLUTCH RELEASE  
Filed June 19, 1925
1,582,754
3 Sheets-Sheet 1
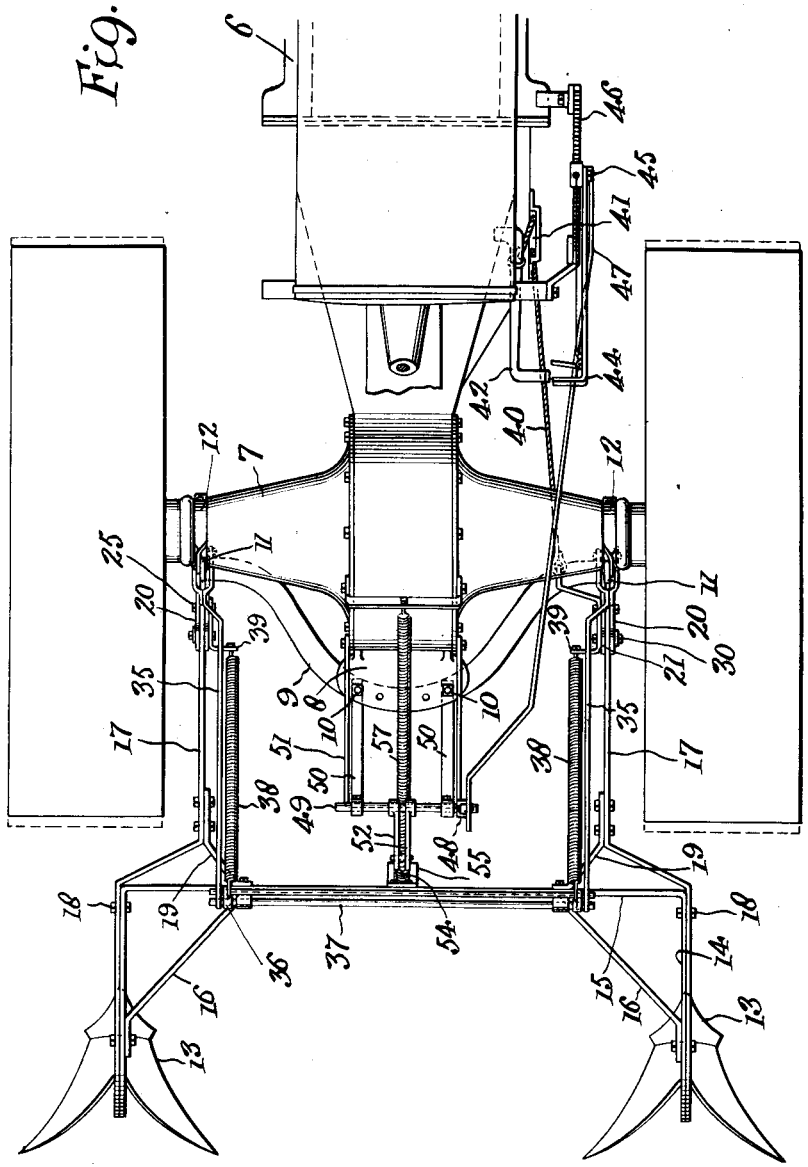
INVENTOR
John Ing
BY
F. E. Hunter
ATTORNEY

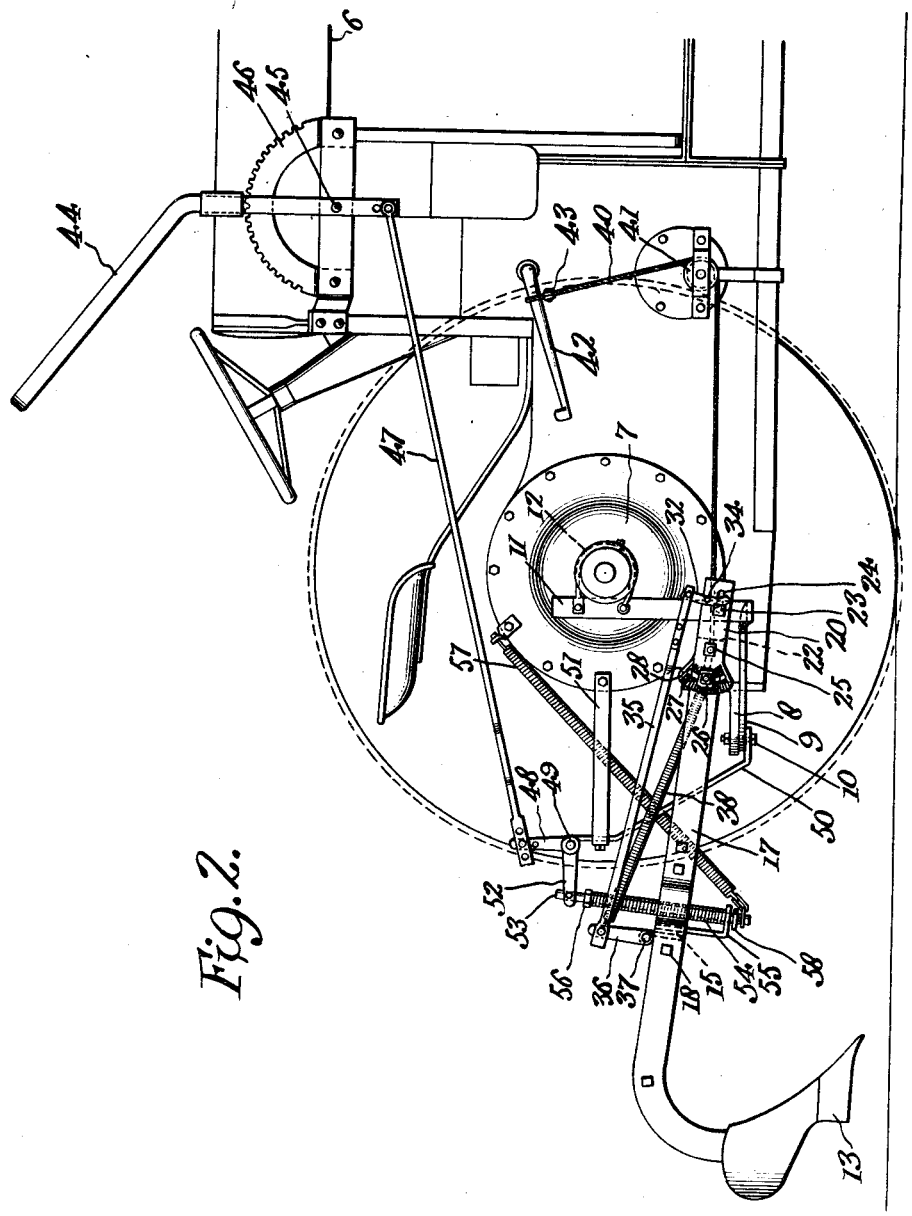

April 27, 1926.
J. ING
TRACTOR CLUTCH RELEASE
Filed June 19, 1925    3 Sheets-Sheet 3
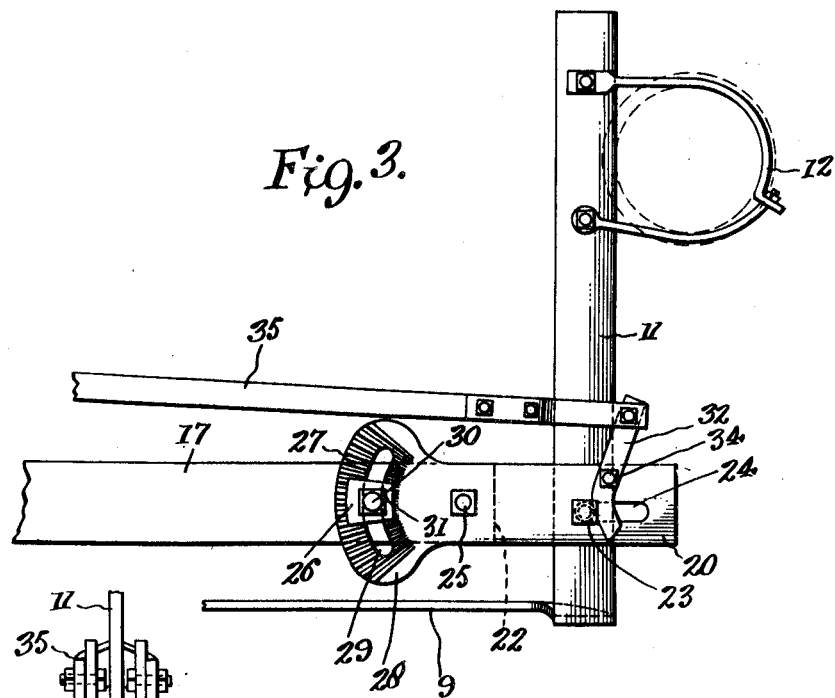
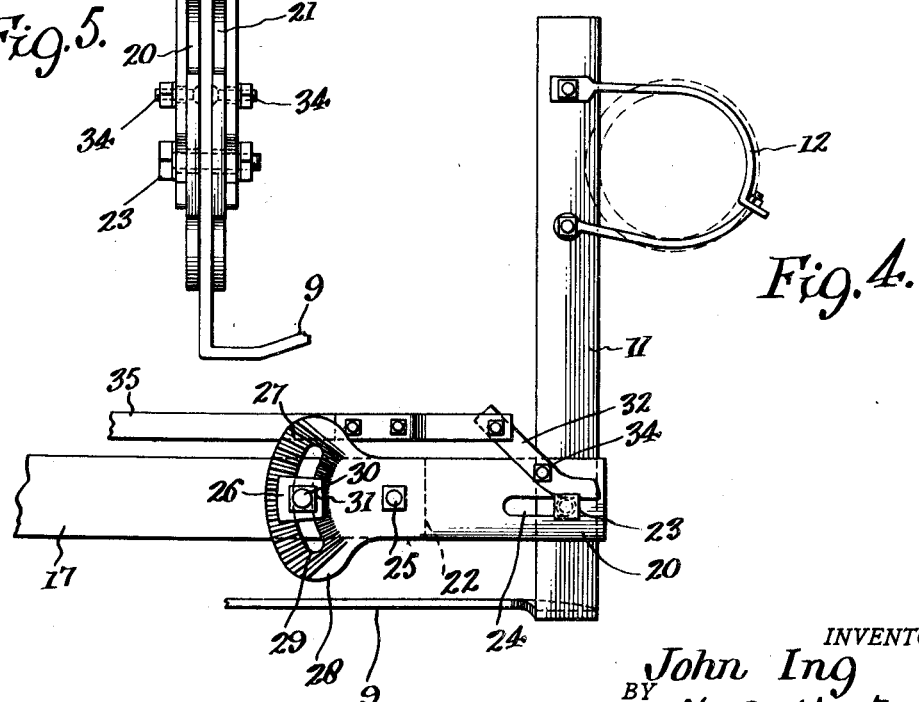
INVENTOR
John Ing
BY F. E. Hunter
ATTORNEY Patented Apr. 27, 1926.

1,582,754

UNITED STATES PATENT OFFICE.

JOHN ING, OF EL PASO, TEXAS.

TRACTOR CLUTCH RELEASE.

Application filed June 19, 1925. Serial No. 38,269.

*To all whom it may concern:*

Be it known that I, JOHN ING, a citizen of the United States, residing at El Paso, Texas, have invented certain new and useful Improvements in Tractor Clutch Releases; and I do hereby declare the following to be a full, clear, and exact description of the invention, such as will enable others skilled in the art to which it appertains to make and use the same.

The present invention relates to improvements in tractor clutch release and has for an object to provide an improved plow assembly adapted to be attached to the tractor in which provision is made for the raising and lowering of the plows and for the stopping of the tractor when the plow shares strike stumps, rocks or other impassable barriers that would be apt to result in breakage.

It is another object of the invention to accomplish the above described results in a small, compact, rigid and strong assembly with the parts so constructed and arranged as to admit of the attachment to existing portions of the tractor without involving any changes or alterations therein.

A further object of the invention resides in providing an improved clutch release for the tractor coupled to a plow frame and arranged to be operated when the plow points strike obstacles.

With the foregoing and other objects in view, the invention will be more fully described hereinafter, and will be more particularly pointed out in the claims appended hereto.

In the drawings, wherein like symbols refer to like or corresponding parts throughout the several views, Figure 1 is a fragmentary plan view of a tractor with the improved plow assembly.

Figure 2 is a side elevation looking in from the right in Figure 1, with one of the tractor wheels removed.

Figure 3 is an enlarged side elevation of portions of the plow frame and supporting brackets showing the normal coupled position of the parts.

Figure 4 is a similar comparative view showing the disengaged position of the parts, and Figure 5 is a fragmentary edge view looking in from the right in Figure 3.

Referring more particularly to the drawings 6 designates generally a Fordson or other type of tractor. The improved attachment is shown for convenience in connection with a Fordson tractor, but it is to be understood that with minor modifications of the attaching parts that it is equally applicable to other forms of tractors. The tractor rear axle housings are indicated at 7 and the draw bar cap plate at 8.

In accordance with the invention a piece of strap metal 9 is used to connect the plow assembly to the draw bar and rear axle housings, the intermediate portion of this strap metal 9 being passed beneath the draw bar cap 8 and secured thereto as by the bolts 10. The strap 9 is bent forwardly and made to diverge outwardly from the draw bar and the ends thereof are turned upwardly to provide the two supporting upright brackets 11. These brackets pass directly behind the axle housings and are secured thereto as by the clamps 12.

The plow points or "busters" are indicated at 13. In the drawings these are shown to be two in number, although the assembly may consist of one or more of the plow points of any description. The plow beams 14 are connected by the transverse connecting bar 15 and appropriate diagonal braces 16 are connected between the plow beams 14 and the cross bar 15. Extension plow beams 17 are secured as by the bolts 18 to the main plow beams 14 and these extension beams are carried forwardly and offset inwardly to escape the wheels of the tractor. These extension beams 17 are also preferably reinforced by the diagonal braces 19 connected thereto and to the cross bar 15. The forward ends of the extension beams 17 are each placed between pairs of adjusting coupling bars 20 and 21.

In Figure 3 the dotted line 22 indicates the forward end of one of the extension beams 17 indicating that it terminates short of the upright bracket 11 to which the pair of bars 20 and 21 are pivoted. The bolt or pivot is indicated at 23 and the bars 20 and 21 are provided with the horizontally elongated slots 24 to receive, and slide on, the ends of the bolt 23. The forward ends of the extension beams 17 are pivoted, as indicated at 25, to the two coupling bars 20 and 21 and the extension beam 17 is normally held rigid with the coupling bars by the engagement of the plate 26 with the roughened surface 27 of one or more of the enlarged segmental heads 28 of the coupling bars 20 and 21. Such enlarged heads are provided with the arcuate slots 29 in which the bolts 30 of the extension beams play. The nuts 31 on the bolts 30 serve to tighten the plates 26 against the roughened heads to secure the parts in adjusted position. This arrangement provides for changing the angularity of the plow beams and the plows.

When in operating position the plow beams and the respective two coupling bars 20 and 21 form a rigid integral structure and this structure is normally held in the forward position by the engagement of the lower curved ends of the two trip fingers 32 and 33 with the ends of the bolt 23 projecting beyond the sides of the coupling bars 20 and 21. This is shown in Figures 3, 4 and 5. There are a pair of the trip fingers at each side of the tractor and these trip fingers are pivoted as at 34 to the coupling bars 20 and 21 just above the slots 24.

The upper ends of the trip fingers 32 and 33 are connected to the links 35 which extend rearwardly and upwardly and are pivoted at their rear ends to the upstanding arms 36 on the cross shaft 37 carried in appropriate bearings by the plow frames. The arms 36 are also connected to the springs 38, which are fastened at their forward ends to the fixed brackets 39. The springs 38 have a tendency to draw the arms 36 forwardly and to urge the curved lower ends of the fingers 32 against the bolts 23.

The brackets 39 also afford suitable fixed supports on one of the plow frames for the attachment of the cable 40 which extends forwardly, engages over the pulley 41 and extends up to the clutch pedal 42 of the tractor. The clasp 43 is used for engaging the cable to the clutch pedal whereby the cable may be quickly removed.

The device for elevating the plow frames about the pivot points 23 is operated by means of the hand lever 44 pivoted at 45 in the latch segment 46 by which the lever is held in adjusted position. The lower end of the lever is pivoted to the link 47 which extends rearwardly and downwardly with its rear end coupled to the upstanding arm 48 on the shaft 49. This shaft is carried in appropriate bearings on the supports 50, which are bolted to the draw bar of the tractor and extend upwardly and rearwardly therefrom. The supports are strengthened by the braces 51, which are held in place by the bolts of the axle housing. The shaft 49 is provided with a pair of arms 52 extending rearwardly and receiving therebetween the plunger rod 53. The plunger rod is pivoted to the arms and extends downwardly through the coil spring 54, the lower end of which engages the bracket 55 on the plow frame. The rod 53 extends loosely through the bracket 55 and the spring 54 urges the plow frames yieldably downward. The upper end of the spring 54 engages against a fixed collar 56 on the rod 53. This collar exerts a downward thrust on the spring and causes the yieldable lowering of the plow frames. This action is counter balanced by the coil tension spring 57 coupled at its lower end to the lower end of the plunger rod 53 and at its upper end to the bolts of the axle housing.

In the use of the device the coil spring 57 will constantly exert a lifting effect on the plow frames to hold them for instance in the position indicated in Figure 2. By pushing the lever 44 forwardly the link 47 is thrust rearwardly causing the arms 48 and 52 to move in a counter clock wise direction and force the plunger rod 53 and the plow shares downwardly into the ground to the proper depth. Whenever the lever 44 is returned in the opposite direction the counter balanced spring 57 will draw the plow frames upwardly. The lower end of the plunger rod 53 is provided with the collar or washer 58 adapted to engage beneath the bracket 56 for the purpose also of lifting the plow frames.

Whenever the plows strike roots, stones or other obstacles likely to break the same, the undue resistance overcomes the action of the coil springs 38. These coil springs are selected of a strength to resist the normal action of the plows in the ground and such coil spring will maintain the trip fingers 32 against the pivot pins 23 of the plow frames. See the condition of the parts in Figure 3. However, when the resistance to the passage of the plow points in the ground exceeds the force of the coil springs 38 the plows will be arrested while the tractor moves along with the pivot pins 23 advancing in the slots 24. The fingers 32, links 35 and arms 36 will be tripped to the position indicated in Figure 4 and at the same time the cable 40 will be pulled upon for a distance equal to the lenghts of the slots 24. This distance will be the same as the throw of the clutch pedal 42 to enable the cable to depress the clutch pedal, throw out the clutch and arrest the movement of the tractor before any damage is done.

To restore the parts to the initial operative position, the clasp 43 is undone to permit the clutch 42 to be reengaged, the tractor is thrown into reverse and backed up until the pivot pins 23 are again in the rear portions of the slots 24. The trip fingers and associated parts will follow the pivot pins to the restored normal position and the action of plowing may be proceeded with after removal of the obstructions or the lifting of the plows thereover.

It is obvious that various changes and modifications may be made in the details of construction and design of the above specifically described embodiment of this invention without departing from the spirit thereof, such changes and modifications being restricted only by the scope of the following claims:—

What is claimed is:—

1. In combination with a tractor having a clutch and a fulcrum, a slotted plow assembly shiftable pivotally and longitudinally on said tractor fulcrum, means acting directly on said fulcrum for yieldably holding the plow assembly in a forward position against longitudinal motion, and a taut connection between said plow assembly and tractor clutch.

2. In combination with a tractor having a clutch and a fulcrum, a slotted plow assembly fitted pivotally and slidably on said tractor fulcrum, yieldable means carried by said plow assembly and acting against said fulcrum for holding the plow assembly in a normally forward position without interfering with the pivotal movement about said fulcrum, and a connection between said tractor clutch and the plow assembly for releasing the clutch on longitudinal rearward motion of the plow assembly with respect to said fulcrum.

3. In combination with a tractor having a clutch and a fixed fulcrum, a slotted plow assembly fitted loosely over said fulcrum, a trip finger carried by said plow assembly and adapted to engage said fulcrum for holding the plow assembly in a normally forward position, yieldable means acting on said trip finger for holding the same in the forward position, and a taut connection between the tractor clutch and the plow assembly.

4. In combination with a tractor having a clutch and a fixed fulcrum, a slotted plow assembly having its slotted part pivotally engaging and slidable on said fulcrum, trip fingers carried by said plow assembly for engaging said fulcrum, yieldable means acting on said trip fingers for holding the plow assembly in a normally forward position, and a taut connection between said plow assembly and the tractor clutch.

5. In combination with a tractor having a clutch and a fixed fulcrum, a plow having a plow beam, a pair of plates fitted to the forward end of said plow beam and pivoted thereto with horizontally slotted end portions extending forwardly from the pivot point and loosely engaged with said fulcrum, trip fingers directly pivoted to said plates and having lower curved ends directly engaged with said fulcrum, resilient means for urging the fingers against the fulcrum, and a taut connection between said plow beam and the tractor clutch.

JOHN ING.